United States Patent [19]
Kinard
[11] 3,729,203
[45] Apr. 24, 1973

[54] TAPE SIDE AND TRACK DIRECTION INDICATION

[76] Inventor: William C. Kinard, 3710 Alder Lane, Pasadena, Calif. 91107

[22] Filed: Oct. 16, 1970

[21] Appl. No.: 81,427

[52] U.S. Cl. ....................................274/41.4, 274/43
[51] Int. Cl. ........................G11b 27/10, G11b 23/40
[58] Field of Search ......................274/41.4, 43, 42 P; 35/35 C; 33/127, 128

[56] References Cited

UNITED STATES PATENTS

| | | | |
|---|---|---|---|
| 2,946,127 | 7/1960 | Loewe | 33/128 |
| 2,976,372 | 3/1961 | Sampson | 179/100.2 E |
| 3,158,938 | 12/1964 | Phillips | 33/128 |
| 1,335,651 | 3/1920 | Bullis | 274/43 |
| 1,904,944 | 4/1933 | Herklots | 274/43 |
| 2,511,708 | 6/1950 | Hammond | 274/42 P |
| 3,233,512 | 2/1966 | Sampson | 35/35 C |
| 3,558,142 | 1/1971 | Poessel | 274/43 |

*Primary Examiner*—Leonard Forman
*Assistant Examiner*—Dennis A. Dearing
*Attorney*—Christie, Parker & Hale

[57] ABSTRACT

A reel-to-reel magnetic recording tape is indexed with symbols such as numerals, letters or colored dots, to identify the way the tape is wound on its reel so the user may determine which track on the tape will be played back when played on a tape player. Indexing means such as a colored strip extending lengthwise along at least one edge of the tape identifies the track that will be played back, and also marks the directions of tracks recorded on the tape for use in properly splicing the tape.

3 Claims, 10 Drawing Figures

INVENTOR.
WILLIAM C. KINARD
BY
Christie Parker & Hale
ATTORNEYS

TAPE SIDE AND TRACK DIRECTION INDICATION

BACKGROUND OF THE INVENTION

1. Field of the Invention

This invention relates to an improved reel-to-reel magnetic recording tape.

2. Description of the Prior Art

A magnetic tape played on a reel-to-reel tape recorder has one track on its upper side and a second track on its lower side. Some reel-to-reel tape recorders are adapted to record two tracks on the upper side of the tape and two different tracks on the lower side. When a track on one side of the tape is being recorded or played, the beginning of the track is wound to the inside of the take-up reel. To play the track on the other side of the tape, the filled take-up reel is inverted and placed in the supply station of the tape recorder, the empty reel is placed on the take-up spindle of the recorder, and the tape is driven in the opposite direction, with the beginning of the second track being wound to the inside of the new take-up reel. If the user later wishes to play the second track, he must rewind the tape, or play the track on the other side of the tape, before the second track is in the correct position for playing.

Tape users often fail to keep track of the direction in which a tape is wound onto the take-up reel, with the result that they are often not sure which side of the tape they will hear when they start to play it. Frequently, a tape user would not even start a tape if he knew that a particular side of the tape would play first.

Moreover, the user of conventional tapes for reel-to-reel recorders often splices his tape improperly. For example, the user may wish to splice a reel-to-reel tape to insert a taped section of message B between message A and message C. If he fails to remember the direction of the track on which message B is recorded, the final tape may include a backward message between messages A and C.

SUMMARY OF THE INVENTION

Briefly, this invention provides a magnetic recording tape having an upper edge and a lower edge, and edge indexing means visibly marked on it and associated with at least one edge of the tape for indicating the track of the tape that will be played back when the tape is run against a sound head. Thus, the user will know which track of the tape will be played when the tape is played on a tape player.

In a preferred form of the invention, the indexing means are symbols for numerically ordering the edges of the tape. The symbols may comprise numerals, alphabetical symbols, or symbols of one color located at one end of the tape, preferably with a different numeral, alphabetical symbol, or colored symbol, respectively, at the other end of the tape. The user simply observes the symbol appearing at the free end of the tape to determine which track of the tape will play.

In another form of the invention, the edge indexing means extends lengthwise along at least one edge of the tape. For example, a color strip may extend along one edge of the tape, with the remaining portion of the tape having a different color. This embodiment of the invention enables the user to immediately determine which track of the tape is in position to play, because he will know that the color strip either faces up or faces down when a particular track of the tape is played. The color strip also enables the user to arrange sections of tape in their proper directions when splicing the tape, because the presence of the color strip on a particular edge of the tape identifies the proper direction of the sound track having the particular message, song, or the like, to be spliced.

BRIEF DESCRIPTION OF THE DRAWINGS

The above-mentioned and other features of the invention are more fully set forth in the following detailed description of the embodiments of the invention which are presently preferred, such description being presented with reference to the accompanying drawings, wherein.

DETAILED DESCRIPTION OF THE PREFERRED EMBODIMENTS

Figure 1:
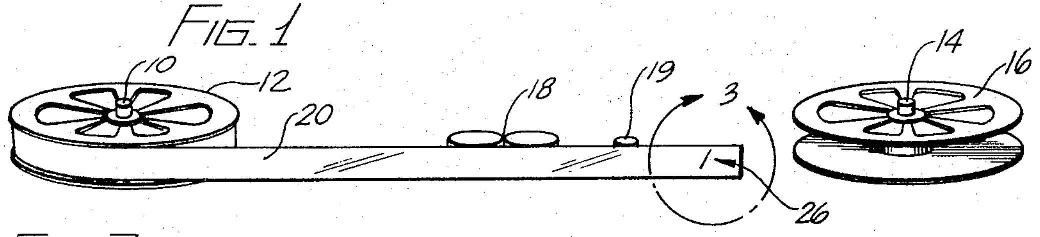
FIG. 1 is a perspective view showing the indexed magnetic recording tape of this invention on a reel-to-reel tape recorder.
Figure 2:
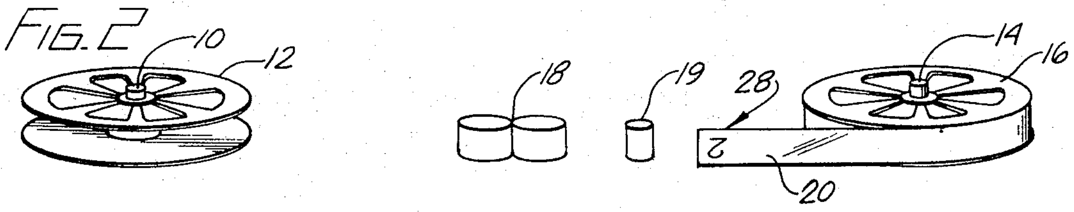
FIG. 2 is a perspective view showing the tape of FIG. 1 completely wound onto a take-up reel.
Figure 3:
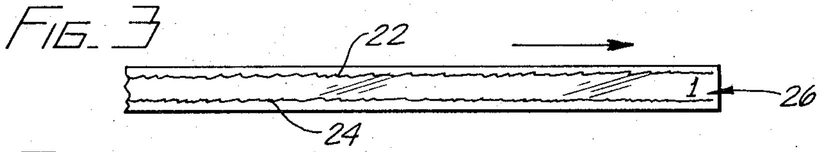
FIG. 3 is an enlarged elevation of the tape within the circle 3 of FIG. 1 showing upper and lower sound tracks recorded on the tape.

Referring to FIGS. 1 through 3, a reel-to-reel tape recorder has a supply reel spindle 10, a supply reel 12 mounted on the spindle, a take-up reel spindle 14 spaced laterally from the supply reel spindle, a take-up reel 16 mounted on the take-up spindle, and a magnetic sound head 18 between the supply reel and the take-up reel. A capstan 19 is located between the sound head and the take-up reel along the tape path through the recorder to cooperate with a pinch roller for pulling tape past the sound head at a desired velocity. A magnetic recording tape 20 is wound on the supply reel 12. During use of the tape recorder, the tape 20 is moved past sound head 18 and wound onto the take-up reel 16 in the well known manner.

When the tape is run against and past the sound head 18, a first sound track 22 adjacent the upper edge of the tape is recorded or played. Alternatively, the tape recorder can be adapted to record or play a sound track adjacent the lower edge of the tape when the tape is run against the sound head. When the end of the tape is reached, as shown in FIG. 2, a second sound track 24 adjacent the lower edge of the tape shown in FIGS. 1–3 may be recorded or played by reversing the positions of the reels. The take-up reel 16 is mounted on supply spindle 10 and the empty supply reel 12 is mounted on the take-up spindle 16. The tape is then run against the sound head 18 and the second sound track 24, which is now along the upper edge of the tape, is recorded or played.

This invention is based on the recognition that the user of tapes for reel-to-reel tape recorders often is not sure which sound track he will hear when he plays the tape, or he often discovers that the sound track he thought would play is in the wrong position. Different systems for marking the reels may be used to keep account of the track of the tape that is in position for playing, but the user often discovers that it is quite easy to forget to match the take-up reel with the supply reel before playing the tape, with the result that he usually does not know which track of the tape he will hear the next time he plays it.

I have invented an indexed magnetic recording tape which overcomes the difficulties associated with keeping account of the locations of respective sound tracks on the tape. As shown in FIGS. 1 and 3, an indexing mark 26, such as the numeral 1, is printed at one end of the tape on the reverse side of the tape, the obverse side of the tape carries the conventional iron oxide coating. As shown in FIG. 2, an indexing mark 28, such as the numeral 2, is printed at the other end of the tape on the reverse side of the tape. Each numeral is preferably printed so it appears right-side-up when its opposite end of the tape is wound to the outside of the reel, and when the reel is placed in the proper position on the supply spindle of the tape recorder. Thus, the indexing mark 26 appears right-side-up when the reel 12 is mounted on the supply spindle 10, and the indexing mark 28, which is wound to the inside of reel 12, is inverted relative to indexing mark 26. When reel 16 is placed on the supply spindle, indexing mark 28 appears right-side-up.

When using the indexed recording tape of this invention, the user immediately may ascertain which of the sound tracks on the tape will play when the tape is run against the sound head. For example, if the numeral 1 appears at the free end of the tape, as shown in FIGS. 1 and 3, the user knows that the first sound track 22 is on the upper side of the tape and therefore in position to play. Conversely, when the numeral 2 appears at the free end of the tape, the second sound track 24 is on the upper side of the track in position to play. Thus, there is no need to mark the reels and remember to match the mark on the supply reel with the mark on the take-up reel. The indexing marks provide a permanent indication of the locations of the sound tracks recorded on the tape.

Figure 4:
FIG. 4 is an elevation showing alternative means for indexing the tape.

Indexing marks other than those shown in FIGS. 1–3 may be used to identify the edge of the tape on which a particular sound track is located. FIG. 4 shows a magnetic recording tape 29 with an indexing mark 30 in the form of an alphabetical symbol, such as the letter A, printed on one end of the tape, and a different indexing symbol 32, such as the letter B, printed on the other end of the tape.

Figure 5:
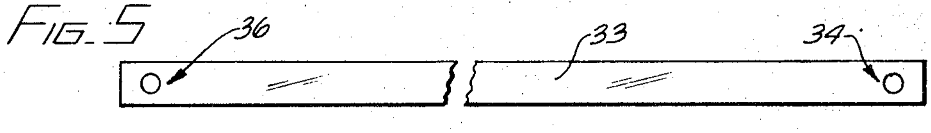
FIG. 5 is an elevation showing further alternative means for indexing the tape.

FIG. 5 shows a further embodiment of the invention in which a tape 33 has an indexing mark 34 in the form of a colored dot printed at one end of the tape, and an indexing mark 36 at the other end of the tape which is preferably a dot of a different color.

Figure 6:
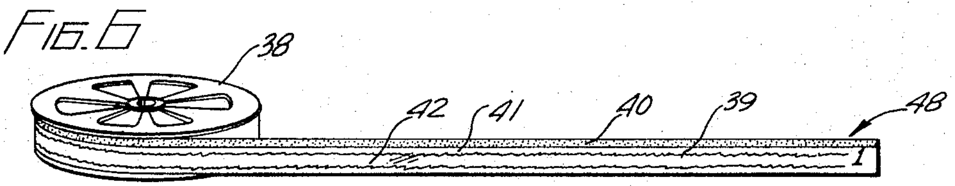
FIG. 6 is a perspective view showing a color strip on one edge of a tape.

FIG. 6 shows a reel 38 with a magnetic recording tape 39 having a color strip 40 along its upper edge. The color strip has a color which is different from that of the rest of the tape, and it is preferably a color such as white or yellow, which is easily distinguished from the reddish-brown color of the iron oxide film which is visible through the transparent tape strip. The color strip 40 is useful in marking the locations of a sound track 41 on the upper half and a sound track 42 on the lower half of the tape. For example, if sound track 41 plays or is recorded when the color strip 40 is at the top of the tape, as shown in FIG. 6, the sound track 42 plays or is recorded when the tape is wound on a reel so that the color strip 40 is at the bottom of the tape when the tape plays.

The tape 39 also enables the user to splice together sections of tape so the sound tracks on different tape sections are aligned in the same longitudinal direction on the finished tape. For example, it is often desirable to insert a taped section of a message or the like at an intermediate portion of a tape. In splicing tape sections, the user often discovers he is not able to ascertain the beginning and the end of the tape section to be inserted. The tape 39 solves this tape splicing problem, because the user is able to splice sections of the tape together so that the color strips 40 of the respective tape sections are aligned longitudinally to correspond to the sides on which they were located when the sound track on them were recorded. For example, if the tape sections to be spliced were all recorded when the color strip 40 was at the top of the tape, as shown in FIG. 6, the tape sections are spliced properly simply by matching the color strips of the respective tape sections so they make a continuous line along the upper edge of the tape.

Figure 7:
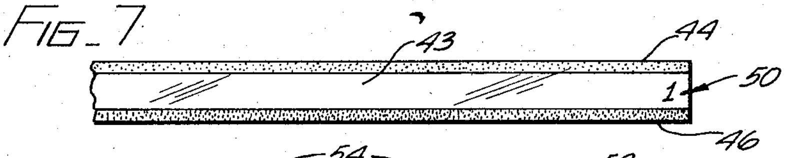
FIG. 7 is an elevation showing a separate color strip on each edge of a tape, with each strip having a color different from that of the other.
Figure 8:
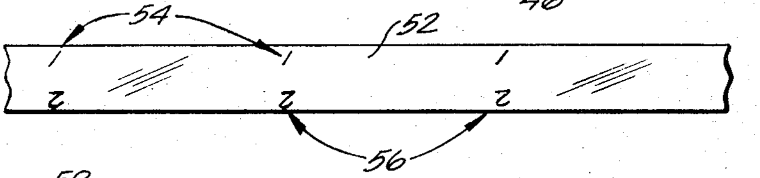
FIG. 8 is an elevation showing a line of indexing marks along the upper edge of a tape, and a line of different indexing marks along the lower edge of the tape.

FIG. 7 shows an alternative tape 43 which is useful both in tape splicing and identifying the correct edge for a given sound track. Tape 43 has a color strip 44 along its upper edge, and a color strip 46 of a different and darker color along the lower edge. A further alternative to the tapes shown in FIGS. 6 and 7 is the tape 52 shown in FIG. 8, in which a plurality of longitudinally spaced apart indexing marks 54, such as the numerals 1, are printed along the upper edge of the tape, with a plurality of different longitudinally spaced apart indexing marks 56, such as the numerals 2, are printed along the lower edge of the tape.

The ends of the tapes 39 and 43 are given index symbols 48 and 50, respectively, such as the numeral 1. Preferably, the numerals 2 would be printed upside down at the other ends of the respective tapes. These additional tape side indexing means are preferred because they are numerical in nature, and therefore are associated naturally with one side of the tape or the other. Alphabetical symbols such as A or B are also numerical in nature, and therefore automatically associated in the user's mind with one side or the other of the tape. These indexing means are preferred to color coding, such as colored dots or color strips, because colors are not naturally associated with one side or the other of a tape.

Figure 9:
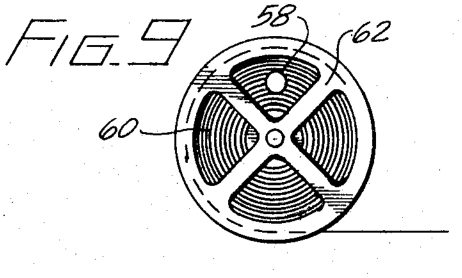
FIG. 9 is an elevation showing an indexing mark stamped on the edge portion of tape exposed between two adjacent spokes of a reel.

FIG. 9 shows an alternative form of the invention in which an indexing mark is preferably a colored spot, shown in FIG. 9, which is stamped on the portion of tape exposed between two adjacent spokes of reel 62.

When the tape is wound onto a reel so that indexing mark 58 appears at the edge of the tape 60, as shown in FIG. 9, the user is informed of which track is in position to play when the tape is played on a tape player. If the tape 60 is wound onto another reel, the indexing mark 58 would not be discernible. This would indicate that a certain other track is in position to play.

An indexing mark having a different color (not shown) may be stamped on the opposite edge of the tape, if desired. In this case, the indexing mark is stamped onto the opposite edge of tape 60 when the tape is wound onto another reel (not shown). Thus, when reel 62 is inverted, the indexing mark on the opposite edge of tape 60 does not appear. However, when tape 60 is wound onto a take-up reel, indexing mark 58 would not be discernible, but the mark stamped on the other edge would show when the take-up reel is inverted.

Figure 10:
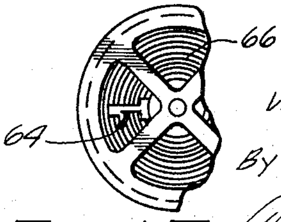
FIG. 10 is an alternative embodiment of the tape shown in FIG. 9.

Other forms of indexing marks may be applied to the edge of the wound-up tape in place of the colored spot. For example, FIG. 10 shows a mark 64 in the form of the numeral 1, stamped on the edge of a tape 66. A different numeral may be stamped on the other side of tape 66, if desired.

I claim:

1. In a magnetic recording tape for reel-to-reel usage and adapted for recording thereon of a first track of information progressing from adjacent one end of the tape toward the other end thereof and of a second track of information progressing from adjacent the other end of the tape toward the one end thereof, the tape having opposite edges extending along the length thereof, the improvement comprising indicia visibly carried by the tape at spaced locations along one edge of the tape for indicating which one of the first and second tracks will be played back when the tape is run against a sound head, the indicia being spaced along the tape so that (1) when the tape is wound on a reel with the one end of the tape at the outer end of the winding, the indicia are cooperatively ordered and associated to define an intelligible symbol, and (2) when the tape is wound on a reel with the other end of the tape at the outer end of the winding, the indicia are insufficiently ordered and associated to define said symbol, said symbol being visible when the wound tape is viewed along the axis of the reel rather than toward the edge of the reel.

2. Apparatus according to claim 1 wherein the desired indicium is at least one symbol for numerically ordering the playing directions of tape movement.

3. Apparatus according to claim 1 wherein the desired indicium is a spot stamped on the edge of the tape.

* * * * *